(12) United States Patent
Jiang et al.

(10) Patent No.: US 11,374,218 B2
(45) Date of Patent: Jun. 28, 2022

(54) MULTILAYER SILOXANE COATINGS FOR SILICON NEGATIVE ELECTRODE MATERIALS FOR LITHIUM ION BATTERIES

(71) Applicant: GM GLOBAL TECHNOLOGY OPERATIONS LLC, Detroit, MI (US)

(72) Inventors: Meng Jiang, Rochester Hills, MI (US); Lei Wang, Rochester Hills, MI (US); Raghunathan K, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 278 days.

(21) Appl. No.: 16/547,084

(22) Filed: Aug. 21, 2019

(65) Prior Publication Data
US 2021/0057752 A1    Feb. 25, 2021

(51) Int. Cl.
*H01M 4/38* (2006.01)
*H01M 4/62* (2006.01)
(Continued)

(52) U.S. Cl.
CPC ........... *H01M 4/386* (2013.01); *H01M 4/364* (2013.01); *H01M 4/366* (2013.01); *H01M 4/387* (2013.01);
(Continued)

(58) Field of Classification Search
None
See application file for complete search history.

(56) References Cited

U.S. PATENT DOCUMENTS 7,718,156 B2    5/2010    Zhang et al.
7,736,805 B2    6/2010    Nazri et al.
(Continued)

FOREIGN PATENT DOCUMENTS

CN    101125859 A    2/2008
CN    102460781 A    5/2012
(Continued)

OTHER PUBLICATIONS

Halalay, Ion C. et al., U.S. Appl. No. 16/160,799, filed Oct. 15, 2018 entitled "Method for Making Silicon-Containing Composite Electrodes for Lithium-Based Batteries," 47 pages.
(Continued)

*Primary Examiner* — Ula C Ruddock
*Assistant Examiner* — Tony S Chuo
(74) *Attorney, Agent, or Firm* — Harness, Dickey & Pierce, P.L.C.

(57) ABSTRACT

A negative electroactive material for use in a negative electrode of an electrochemical cell that cycles lithium ions is provided. The negative electroactive material includes a particle defining a core region that includes silicon, silicon-containing alloys, tin-containing alloys, and combinations thereof. A porous, elastomeric multilayer coating is disposed on a surface of the core region that includes a first carbonaceous layer and a second porous elastomeric layer. The second porous elastomeric layer includes siloxane and a plurality of electrically conductive particles. The multilayer coating is capable of reversibly elongating from a contracted state to an expanded state in at least one direction to minimize or prevent fracturing of the plurality of negative electroactive material particles during lithium ion cycling.

20 Claims, 4 Drawing Sheets

(51) Int. Cl.
  *H01M 10/0525* (2010.01)
  *H01M 4/36* (2006.01)
  *H01M 4/02* (2006.01)

(52) U.S. Cl.
  CPC ............ *H01M 4/622* (2013.01); *H01M 4/625* (2013.01); *H01M 4/628* (2013.01); *H01M 10/0525* (2013.01); *H01M 2004/021* (2013.01); *H01M 2004/027* (2013.01)

(56) References Cited

U.S. PATENT DOCUMENTS

| | | | |
|---|---|---|---|
| 8,092,922 B2 | 1/2012 | Lev et al. | |
| 8,101,152 B1 | 1/2012 | Halalay et al. | |
| 8,399,138 B2 | 3/2013 | Timmons | |
| 8,420,259 B2 | 4/2013 | Xiao et al. | |
| 8,440,350 B1 | 5/2013 | Verbrugge et al. | |
| 8,642,201 B2 | 2/2014 | Cheng et al. | |
| 8,658,295 B2 | 2/2014 | Cheng et al. | |
| 8,679,680 B2 | 3/2014 | Vanimisetti et al. | |
| 8,828,481 B2 | 9/2014 | Burton et al. | |
| 8,835,056 B2 | 9/2014 | Xiao et al. | |
| 8,852,461 B2 | 10/2014 | Liu et al. | |
| 8,859,144 B2 | 10/2014 | Xiao | |
| 8,999,584 B2 | 4/2015 | Jiang et al. | |
| 9,005,811 B2 | 4/2015 | Xiao et al. | |
| 9,012,075 B2 | 4/2015 | Verbrugge et al. | |
| 9,034,519 B2 | 5/2015 | Xiao et al. | |
| 9,059,451 B2 | 6/2015 | Xiao et al. | |
| 9,093,705 B2 | 7/2015 | Xiao et al. | |
| 9,142,830 B2 | 9/2015 | Xiao et al. | |
| 9,153,353 B2 | 10/2015 | Liu et al. | |
| 9,153,819 B2 | 10/2015 | Huang et al. | |
| 9,302,914 B2 | 4/2016 | Liu et al. | |
| 9,356,281 B2 | 5/2016 | Verbrugge et al. | |
| 9,362,551 B2 | 6/2016 | Sachdev et al. | |
| 9,362,552 B2 | 6/2016 | Sohn et al. | |
| 9,379,374 B2 | 6/2016 | Liu et al. | |
| 9,531,004 B2 | 12/2016 | Xiao et al. | |
| 9,564,639 B2 | 2/2017 | Huang | |
| 9,570,752 B2 | 2/2017 | Huang et al. | |
| 9,577,251 B2 | 2/2017 | Xiao et al. | |
| 9,583,767 B2 | 2/2017 | Verbrugge et al. | |
| 9,627,716 B2 | 4/2017 | Yang et al. | |
| 9,653,734 B2 | 5/2017 | Liu et al. | |
| 9,780,361 B2 | 10/2017 | Xiao et al. | |
| 9,859,554 B2 | 1/2018 | Xiao et al. | |
| 10,062,898 B2 | 8/2018 | Xiao | |
| 10,141,569 B2 | 11/2018 | Verbrugge et al. | |
| 10,164,245 B2 | 12/2018 | Huang | |
| 10,199,643 B2 | 2/2019 | Zhou et al. | |
| 10,326,136 B2 | 6/2019 | Xiao et al. | |
| 10,396,360 B2 | 8/2019 | Xiao et al. | |
| 10,424,784 B2 | 9/2019 | Yang et al. | |
| 10,637,048 B2 | 4/2020 | Qi et al. | |
| 2002/0009639 A1 | 1/2002 | Miyake et al. | |
| 2006/0127773 A1 | 6/2006 | Kawakami et al. | |
| 2008/0044735 A1 | 2/2008 | Ryu et al. | |
| 2009/0087731 A1 | 4/2009 | Fukui et al. | |
| 2009/0208780 A1 | 8/2009 | Sun et al. | |
| 2010/0297502 A1 | 11/2010 | Zhu et al. | |
| 2011/0073804 A1 | 3/2011 | Sotokawa et al. | |
| 2012/0077087 A1 | 3/2012 | Cho et al. | |
| 2012/0100403 A1 | 4/2012 | Wang et al. | |
| 2012/0229096 A1 | 9/2012 | Nazri | |
| 2012/0328927 A1 | 12/2012 | Timmons et al. | |
| 2012/0328956 A1 | 12/2012 | Oguni et al. | |
| 2013/0099159 A1 | 4/2013 | Halalay et al. | |
| 2013/0323595 A1 | 12/2013 | Sohn et al. | |
| 2013/0330619 A1 | 12/2013 | Archer et al. | |
| 2015/0162602 A1 | 6/2015 | Dadheech et al. | |
| 2015/0357648 A1* | 12/2015 | Sugimoto | H01M 10/0525 429/217 |
| 2016/0164073 A1 | 6/2016 | Liu et al. | |
| 2016/0172665 A1 | 6/2016 | Zhou et al. | |
| 2016/0285090 A1 | 9/2016 | Ozkan et al. | |
| 2017/0098817 A1 | 4/2017 | Yu et al. | |
| 2017/0117538 A1 | 4/2017 | Bendimerad et al. | |
| 2017/0141382 A1 | 5/2017 | Dadheech et al. | |
| 2017/0271678 A1 | 9/2017 | Yang et al. | |
| 2017/0338490 A1 | 11/2017 | Xiao et al. | |
| 2017/0352878 A1 | 12/2017 | Kajita | |
| 2018/0123124 A1 | 5/2018 | Yang et al. | |
| 2018/0205114 A1 | 7/2018 | Pauric et al. | |
| 2019/0115617 A1* | 4/2019 | Pan | H01M 4/366 |
| 2019/0273250 A1* | 9/2019 | Zhamu | H01M 4/604 |
| 2019/0372114 A1 | 12/2019 | Yang et al. | |

FOREIGN PATENT DOCUMENTS

| | | |
|---|---|---|
| CN | 103779546 A | 5/2014 |
| CN | 104269559 A | 1/2015 |
| CN | 104350631 A | 2/2015 |
| CN | 105174252 A | 12/2015 |
| CN | 105990608 A | 10/2016 |
| CN | 108023066 A | 5/2018 |
| CN | 110556521 A | 12/2019 |
| CN | 112420985 A | 2/2021 |
| DE | 102017124894 A1 | 5/2018 |
| DE | 102019111559 A1 | 12/2019 |
| KR | 20140135422 A | 11/2014 |
| WO | 2012064702 A2 | 5/2012 |
| WO | 2013154623 A1 | 10/2013 |

OTHER PUBLICATIONS

Wang, Jiangwei et al., "Structural Evolution and Pulverization of Tin Nanoparticles during Lithiation-Delithiation Cycling," Journal of The Electrochemical Society, 161 (11), F3019-F3024 (2014).

Yokoyama, Takuya et al., "Preparation of Porous Silicone Resin Sheet with Phase Inversion in Parallel with Non Solvent Induced Phase Separation and Application to Hollow Particle Formation," Materials Sciences and Applications, 2014, 5, pp. 649-659 (2014); DOI: 10.4236/msa.2014.59067.

Choi, Jang Wook et al., "Promise and reality of post-lithium-ion batteries with high energy densities", Nature Reviews Materials, vol. 1., Mar. 31, 2016, Art. No. 16013, 16 pages, DOI:10.1038/natrevmats.2016.13.

Kobayashi, Naoya et al., "Silicon/soft-carbon nanohybrid material with low expansion for high capacity and long cycle ife lithium-ion battery," Journal of Power Sources, 326 (2016), pp. 235-241.

Liu, Nian et al., "A Yolk-Shell Dseign for Stabilized and Scalable Li-Ion Battery Alloy Anodes", Nano Lett. 2012, 12, pp. 3315-3321; DOI: 10.1021/nl3014814.

Qi, Gonghsin et al., U.S. Appl. No. 15/992,347, filed May 30, 2018 entitled "Silicon Anode Materials," 37 pages.

Xiao, Xingcheng et al., "Regulated Breathing Effect of Silicon Negative Electrode for Dramatically Enhanced Performance of Li-Ion Battery", Adv. Funct. Mater. 2015, 25, 1426-1433, DOI: 10.1002/adfm.201403629.

Yang, Li et al., U.S. Appl. No. 16/539,647, filed Aug. 13, 2019 entitled, "Negative Electrode Including Silicon Nanoparticles Having a Carbon Coating Thereon," 49 pages.

First Office Action for Chinese Patent Application No. 201710984510.0 dated Jun. 30, 2020 with English language machine translation, 14 pages.

Liu, Te-Huan et al., "Structure, energy, and structural transformations of graphene grain boundaries from atomistic simulations," Carbon 49 (2011), pp. 2306-2317; (Published online: Feb. 3, 2011) DOI: 10.1016/j.carbon.2011.01.063.

* cited by examiner

MULTILAYER SILOXANE COATINGS FOR SILICON NEGATIVE ELECTRODE MATERIALS FOR LITHIUM ION BATTERIES

INTRODUCTION

This section provides background information related to the present disclosure which is not necessarily prior art.

The present disclosure pertains to electroactive materials for use in negative electrodes of lithium ion electrochemical cells. The negative electroactive materials have multilayer porous elastomeric siloxane-based coatings to minimize or prevent fracturing of the plurality of negative electroactive material particles as they expand and contract during lithium ion cycling.

By way of background, high-energy density, electrochemical cells, such as lithium ion batteries can be used in a variety of consumer products and vehicles, such as Hybrid Electric Vehicles (HEVs) and Electric Vehicles (EVs). Typical lithium ion and lithium sulfur batteries comprise a first electrode (e.g., a cathode), a second electrode (e.g., an anode), an electrolyte material, and a separator. Often a stack of battery cells are electrically connected to increase overall output. Conventional lithium ion and lithium sulfur batteries operate by reversibly passing lithium ions between the negative electrode and the positive electrode. A separator and an electrolyte are disposed between the negative and positive electrodes. The electrolyte is suitable for conducting lithium ions and may be in solid or liquid form. Lithium ions move from a cathode (positive electrode) to an anode (negative electrode) during charging of the battery, and in the opposite direction when discharging the battery.

Contact of the anode and cathode materials with the electrolyte can create an electrical potential between the electrodes. When electron current is generated in an external circuit between the electrodes, the potential is sustained by electrochemical reactions within the cells of the battery. Each of the negative and positive electrodes within a stack is connected to a current collector (typically a metal, such as copper for the anode and aluminum for the cathode). During battery usage, the current collectors associated with the two electrodes are connected by an external circuit that allows current generated by electrons to pass between the electrodes to compensate for transport of lithium ions.

Typical electrochemically active materials for forming an anode include lithium-graphite intercalation compounds, lithium-silicon alloying compounds, lithium-tin alloying compounds, lithium alloys. While graphite compounds are most common, recently, anode materials with high specific capacity (in comparison with conventional graphite) are of growing interest. For example, silicon has the highest known theoretical charge capacity for lithium, making it one of the most promising materials for rechargeable lithium ion batteries. However, current anode materials comprising silicon suffer from significant drawbacks.

For example, excessive volumetric expansion and contraction during successive charging and discharging cycles is observed for silicon electroactive materials. Such volumetric changes can lead to fatigue cracking and decrepitation of the electroactive material. This may lead to a loss of electrical contact between the silicon-containing electroactive material and the rest of the battery cell, resulting in a decline of electrochemical cyclic performance, diminished Coulombic charge capacity retention (capacity fade), and limited cycle life. This is especially true at electrode loading levels required for the application of silicon containing electrodes in high-energy lithium ion batteries, such as those used in transportation applications.

Accordingly, it would be desirable to develop materials and methods that use silicon or other electroactive materials that undergo significant volumetric changes during lithium ion cycling that are capable of minimal capacity fade and maximized charge capacity in commercial lithium ion batteries with long lifespans, especially for transportation applications.

SUMMARY

This section provides a general summary of the disclosure, and is not a comprehensive disclosure of its full scope or all of its features.

The present disclosure relates to a negative electrode for use in an electrochemical cell that cycles lithium ions. In certain aspects, the negative electrode includes a plurality of negative electroactive material particles including silicon, silicon-containing alloys, tin-containing alloys, and combinations thereof dispersed within a polymeric matrix. The plurality of negative electroactive material particles each has a multilayer coating including a first carbonaceous layer disposed on a surface of each negative electroactive material particle. The multilayer coating further includes a second porous elastomeric layer disposed over the first carbonaceous layer. The second porous elastomeric layer includes siloxane and a first plurality of electrically conductive particles. The multilayer coating is capable of reversibly elongating from a contracted state to an expanded state in at least one direction to minimize or prevent fracturing of the plurality of negative electroactive material particles during lithium ion cycling. The polymeric matrix includes at least one binder and a second plurality of electrically conductive particles distributed therein.

In one aspect, the binder in the polymeric matrix also includes the siloxane. Further, the first plurality of electrically conductive particles and the second plurality of electrically conductive particles are the same composition.

In one aspect, the second porous elastomeric layer includes a plurality of pores and the negative electrode further includes electrolyte distributed in the plurality of pores.

In one aspect, the siloxane includes a cross-linked siloxane formed from a monomer having the formula $(-\text{O}-\text{SiR}^1\text{R}^2)_n$, where $R^1$ and $R^2$ are selected from alkyl and aryl groups.

In one aspect, the cross-linked siloxane includes polydimethylsiloxane (PDMS) or polydiphenylsiloxane (PDPS).

In one aspect, the first carbonaceous layer has a first thickness of greater than or equal to about 1 nm to less than or equal to about 20 nm and the second porous elastomeric layer has a second thickness of greater than or equal to about 1 nm to less than or equal to about 50 nm.

In one aspect, the plurality of negative electroactive material particles has an average diameter ranging from greater than or equal to about 10 nm to less than or equal to about 50 μm. Further, the multilayer coating has an average thickness ranging from greater than or equal to about 2 nm to less than or equal to about 70 nm.

In one aspect, the first plurality of electrically conductive particles is selected from the group consisting of carbon fibers, carbon nanotubes, carbon black, graphite particles, graphene sheet, and combinations thereof.

In one aspect, the first plurality of electrically conductive particles and the second plurality of electrically conductive particles are independently selected from the group consisting of carbon black, graphite particles, carbon fibers, carbon nanotubes, graphene sheet, and combinations thereof.

In one aspect, the plurality of negative electroactive material particles include silicon or a silicon-containing alloy. The siloxane includes cross-linked siloxane includes polydimethylsiloxane (PDMS). The first plurality of electrically conductive particles include carbon black.

In one aspect, the multilayer coating is capable of reversibly elongating by at least 50% from a contracted state to an expanded state in at least one direction to minimize or prevent fracturing of each of the plurality of negative electroactive material particles during lithium ion cycling.

In one further aspect, a lithium-ion electrochemical cell includes the negative electrode as described above The lithium-ion electrochemical cell also includes a positive electrode including a positive electroactive material including lithium, a separator, and an electrolyte. The multilayer coating minimizes or prevents fracturing of the negative electroactive material particles during lithium ion cycling to substantially maintain charge capacity of the lithium-ion electrochemical cell for greater than or equal to about 500 hours of operation.

The present disclosure relates to negative electroactive material for use in a negative electrode of an electrochemical cell that cycles lithium ions. The negative electroactive material includes a core region including silicon, silicon-containing alloys, tin-containing alloys, and combinations thereof. The negative electroactive material also includes a multilayer coating disposed on a surface of the core region. The multilayer coating includes a first carbonaceous layer and a second porous elastomeric layer disposed over the first carbonaceous layer. The second porous elastomeric layer includes siloxane and a plurality of electrically conductive particles. The multilayer coating is capable of reversibly elongating from a contracted state to an expanded state in at least one direction to minimize or prevent fracturing of the negative electroactive material during lithium ion cycling.

In one aspect, the second porous elastomeric layer includes a plurality of pores.

In one aspect, the siloxane includes a cross-linked siloxane formed from a monomer having the formula $(-O-SiR^1R^2)_n$, where $R^1$ and $R^2$ are selected from alkyl and aryl groups.

In one aspect, the cross-linked siloxane includes polydimethylsiloxane (PDMS) or polydiphenylsiloxane (PDPS).

In one aspect, the first carbonaceous layer has a first thickness of greater than or equal to about 1 nm to less than or equal to about 20 nm. The second porous elastomeric layer has a second thickness of greater than or equal to about 1 nm to less than or equal to about 50 nm.

In one aspect, the core region has an average diameter ranging from greater than or equal to about 10 nm to less than or equal to about 50 µm. The multilayer coating has an average thickness ranging from greater than or equal to about 2 nm to less than or equal to about 70 nm.

In one aspect, the plurality of electrically conductive particles is selected from the group consisting of carbon fibers, carbon nanotubes, carbon black, graphite particles, graphene sheet, and combinations thereof.

In one aspect, the core region includes silicon or a silicon-containing alloy. The siloxane includes cross-linked siloxane includes polydimethylsiloxane (PDMS). The plurality of electrically conductive particles include carbon black. The multilayer coating is capable of reversibly elongating by at least 50% from a contracted state to an expanded state in at least one direction to minimize or prevent fracturing of the negative electroactive material during lithium ion cycling.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 3:
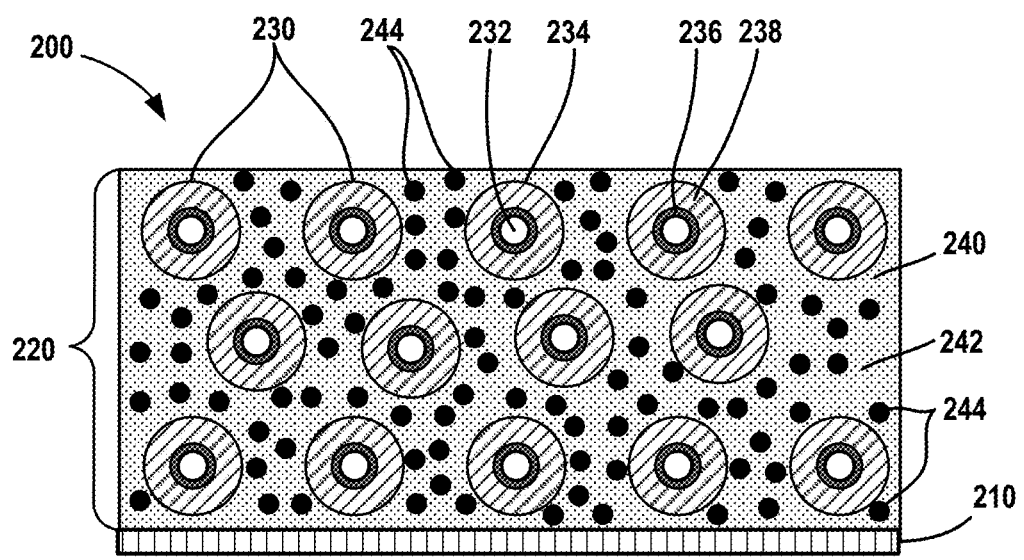
Figure 4:
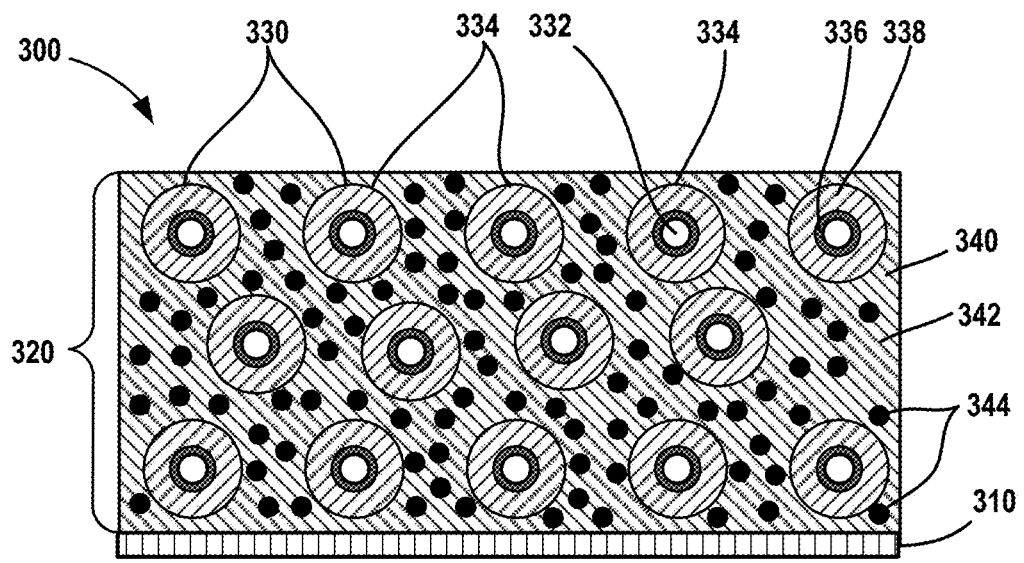

FIG. 3 is an illustration of a cross-sectional view of one embodiment of a negative electrode including a porous matrix with a plurality of negative electroactive material particles prepared in accordance with certain aspects of the present disclosure distributed therein; and FIG. 4 is an illustration of a cross-sectional view of another embodiment of a negative electrode including a porous siloxane matrix with a plurality of negative electroactive material particles prepared in accordance with certain aspects of the present disclosure distributed therein, Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present technology pertains to improved electrochemical cells, especially lithium-ion and lithium sulfur batteries. In various instances, such cells are used in vehicle or automotive transportation applications. However, the present technology may be employed in a wide variety of other applications.

Figure 1:
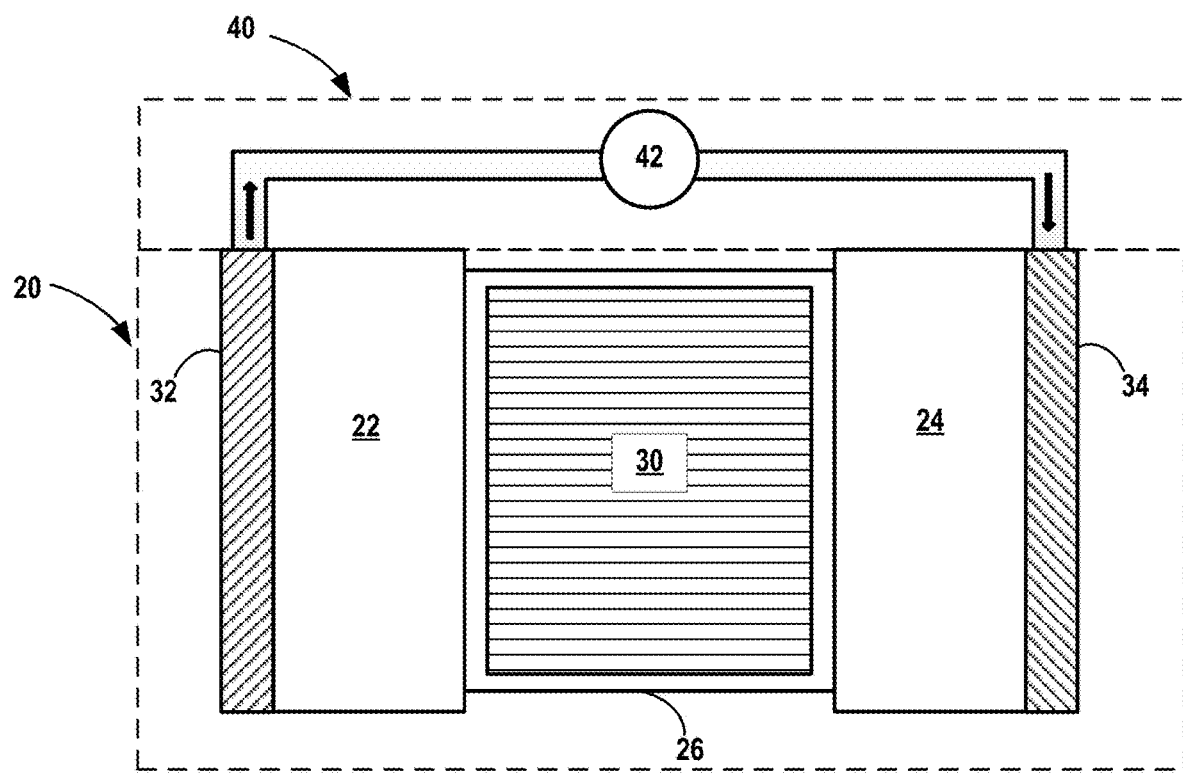
FIG. 1 is a schematic of an example electrochemical battery cell.

An exemplary illustration of an electrochemical cell or battery for cycling lithium ions is shown in FIG. 1. The battery 20 includes a negative electrode 22, a positive electrode 24, and a separator 26 (e.g., a microporous polymeric separator) disposed between the two electrodes 22, 24. The separator 26 comprises an electrolyte 30, which may also be present in the negative electrode 22 and positive electrode 24. A negative electrode current collector 32 may be positioned at or near the negative electrode 22 and a positive electrode current collector 34 may be positioned at or near the positive electrode 24. An interruptible external circuit 40 and load 42 connects the negative electrode 22 (through its current collector 32) and the positive electrode 24 (through its current collector 34).

The battery 20 can generate an electric current during discharge by way of reversible electrochemical reactions that occur when the external circuit 40 is closed (to connect the negative electrode 22 and the positive electrode 24) and the negative electrode 22 contains a relatively greater quantity of lithium than the positive electrode. The chemical potential difference between the positive electrode 24 and the negative electrode 22 drives electrons produced by a reaction, for example, the oxidation of intercalated lithium, at the negative electrode 22 through the external circuit 40 towards the positive electrode 24. Lithium ions that are also produced at the negative electrode 22 are concurrently transferred through the electrolyte 30 contained in the separator 26 towards the positive electrode 24. The electrons flow through the external circuit 40 and the lithium ions migrate across the separator 26 containing the electrolyte solution 30 to form intercalated lithium at the positive electrode 24. As noted above, electrolyte 30 is typically also present in the negative electrode 22 and positive electrode 24. The electric current passing through the external circuit 40 can be harnessed and directed through the load device 42 until the lithium in the negative electrode 22 is depleted and the capacity of the battery 20 is diminished.

The battery 20 can be charged or re-energized at any time by connecting an external power source to the lithium ion battery 20 to reverse the electrochemical reactions that occur during battery discharge. Connecting an external electrical energy source to the battery 20 promotes a reaction, for example, non-spontaneous oxidation of intercalated lithium, at the negative electrode 22 so that electrons and lithium ions are produced. The electrons, which flow back towards the positive electrode 24 through the external circuit 40, and the lithium ions, which are carried by the electrolyte solution 30 across the separator 26 back towards the positive electrode 24, reunite at the positive electrode 24 and replenish it with lithium (e.g., intercalated lithium) for use during the next battery discharge event. As such, a complete discharging event followed by a complete charging event is considered to be a cycle, where lithium ions are cycled between the positive electrode 24 and the negative electrode 22. The external power source that may be used to charge the battery 20 may vary depending on the size, construction, and particular end-use of the battery 20. Some notable and exemplary external power sources include, but are not limited to, an AC-DC converter connected to an AC electrical power grid though a wall outlet and a motor vehicle alternator.

In many lithium-ion battery configurations, each of the negative current collector 32, negative electrode 22, the separator 26, positive electrode 24, and positive electrode current collector 34 are prepared as relatively thin layers (for example, from several microns to a fraction of a millimeter or less in thickness) and assembled in layers connected in electrical parallel arrangement to provide a suitable electrical energy and power package. The negative electrode current collector 32 and positive electrode current collector 34 respectively collect and move free electrons to and from an external circuit 40.

Further, the separator 26 operates as an electrical insulator by being sandwiched between the negative electrode 22 and the positive electrode 24 to prevent physical contact and thus, the occurrence of a short circuit. The separator 26 provides not only a physical and electrical barrier between the two electrodes 22, 24, but also contains the electrolyte solution in a network of open pores during the cycling of lithium ions, to facilitate functioning of the battery 20.

Furthermore, the battery 20 can include a variety of other components that while not depicted here are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 26. The battery 20 described above includes a liquid electrolyte and shows representative concepts of battery operation. However, the battery 20 may also be a solid state battery that includes a solid state electrolyte that may have a different design, as known to those of skill in the art.

As noted above, the size and shape of the battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42. Accordingly, the battery 20 can generate electric current to a load device 42 that is part of the external circuit 40. The load device 42 may be powered by the electric current passing through the external circuit 40 when the battery 20 is discharging. While the electrical load device 42 may be any number of known electrically-powered devices, a few specific examples include an electric motor for an electrified vehicle, a laptop computer, a tablet computer, a cellular phone, and cordless power tools or appliances. The load device 42 may also be an electricity-generating apparatus that charges the battery 20 for purposes of storing electrical energy.

With renewed reference to FIG. 1, the positive electrode 24, the negative electrode 22, and the separator 26 may each include an electrolyte solution or system 30 inside their pores, capable of conducting lithium ions between the negative electrode 22 and the positive electrode 24. Any appropriate electrolyte 30, whether in solid, liquid, or gel form, capable of conducting lithium ions between the negative electrode 22 and the positive electrode 24 may be used in the lithium-ion battery 20. In certain aspects, the electrolyte 30 may be a non-aqueous liquid electrolyte solution that includes a lithium salt dissolved in an organic solvent or a mixture of organic solvents. Numerous conventional non-aqueous liquid electrolyte 30 solutions may be employed in the lithium-ion battery 20. In certain variations, the electrolyte 30 may include an aqueous solvent (i.e., a water-based solvent) or a hybrid solvent (e.g., an organic solvent including at least 1% water by weight).

In certain aspects, the electrolyte 30 may be a non-aqueous liquid electrolyte solution that includes one or more lithium salts dissolved in an organic solvent or a mixture of organic solvents. Numerous aprotic non-aqueous liquid electrolyte solutions may be employed in the lithium-ion battery 20. For example, a non-limiting list of lithium salts that may be dissolved in an organic solvent to form the non-aqueous liquid electrolyte solution include lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium bis(oxalato)borate ($LiB(C_2O_4)_2$) (Li-BOB), lithium difluorooxalatoborate ($LiBF_2(C_2O_4)$), lithium hexafluoroarsenate ($LiAsF_6$), lithium trifluoromethanesulfonate ($LiCF_3SO_3$), lithium bis(trifluoromethane)sulfonylimide ($LiN(CF_3SO_2)_2$), lithium bis(fluorosulfonyl)imide ($LiN(FSO_2)_2$) (LiSFI), and combinations thereof.

These and other similar lithium salts may be dissolved in a variety of aprotic organic solvents, including but not limited to, various alkyl carbonates, such as cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethylmethylcarbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane, 1-2-diethoxyethane, ethoxymethoxyethane), cyclic ethers (e.g., tetrahydrofuran, 2-methyltetrahydrofuran), 1,3-dioxolane), sulfur compounds (e.g., sulfolane), and combinations thereof.

The porous separator 26 may include, in certain instances, a microporous polymeric separator including a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP, or multi-layered structured porous films of PE and/or PP. Commercially available polyolefin porous membranes 26 include CELGARD® 2500 (a monolayer polypropylene separator) and CELGARD® 2320 (a trilayer polypropylene/polyethylene/polypropylene separator) available from Celgard LLC.

In certain aspects, the separator 26 may further include one or more of a ceramic coating layer and a heat-resistant material coating. The ceramic coating layer and/or the heat-resistant material coating may be disposed on one or more sides of the separator 26. The material forming the ceramic layer may be selected from the group consisting of: alumina ($Al_2O_3$), silica ($SiO_2$), and combinations thereof. The heat-resistant material may be selected from the group consisting of: Nomex, Aramid, and combinations thereof.

When the separator 26 is a microporous polymeric separator, it may be a single layer or a multi-layer laminate, which may be fabricated from either a dry or wet process. For example, in certain instances, a single layer of the polyolefin may form the entire separator 26. In other aspects, the separator 26 may be a fibrous membrane having an abundance of pores extending between the opposing surfaces and may have an average thickness of less than a millimeter, for example. As another example, however, multiple discrete layers of similar or dissimilar polyolefins may be assembled to form the microporous polymer separator 26. The separator 26 may also comprise other polymers in addition to the polyolefin such as, but not limited to, polyethylene terephthalate (PET), polyvinylidene fluoride (PVDF), a polyamide, polyimide, poly(amide-imide) copolymer, polyetherimide, and/or cellulose, or any other material suitable for creating the required porous structure. The polyolefin layer, and any other optional polymer layers, may further be included in the separator 26 as a fibrous layer to help provide the separator 26 with appropriate structural and porosity characteristics. In certain aspects, the separator 26 may also be mixed with a ceramic material or its surface may be coated in a ceramic material. For example, a ceramic coating may include alumina ($Al_2O_3$), silicon dioxide ($SiO_2$), titania ($TiO_2$) or combinations thereof. Various conventionally available polymers and commercial products for forming the separator 26 are contemplated, as well as the many manufacturing methods that may be employed to produce such a microporous polymer separator 26.

In various aspects, the porous separator 26 and the electrolyte 30 may be replaced with a solid state electrolyte (SSE) (not shown) that functions as both an electrolyte and a separator. The SSE may be disposed between the positive electrode 24 and negative electrode 32. The SSE facilitates transfer of lithium ions, while mechanically separating and providing electrical insulation between the negative and positive electrodes 22, 24. By way of non-limiting example, SSEs may include $LiTi_2(PO_4)_3$, $LiGe_2(PO_4)_3$, $Li_7La_3Zr_2O_{12}$, $Li_{3x}La_{2/3}$-$xTiO_3$, $Li_3PO_4$, $Li_3N$, $Li_4GeS_4$, $Li_{10}GeP_2Si_{12}$, $Li_2S$—$P_2S_5$, $Li_6PS_5Cl$, $Li_6PS_5Br$, $Li_6PS_5I$, $Li_3OCl$, $Li_{2.99}Ba_{0.005}ClO$, or combinations thereof.

The positive electrode 24 may be formed from a lithium-based active material that can sufficiently undergo lithium intercalation and deintercalation, or alloying and dealloying, while functioning as the positive terminal of the battery 20. One exemplary common class of known materials that can be used to form the positive electrode 24 is layered lithium transitional metal oxides. For example, in certain aspects, the positive electrode 24 may comprise one or more materials having a spinel structure, such as lithium manganese oxide ($Li_{(1+x)}Mn_2O_4$, where $0.1 \leq x \leq 1$), lithium manganese nickel oxide ($LiMn_{(2-x)}Ni_xO_4$, where $0 \leq x \leq 0.5$) (e.g., $LiMn_{1.5}Ni_{0.5}O_4$); one or more materials with a layered structure, such as lithium cobalt oxide ($LiCoO_2$), lithium nickel manganese cobalt oxide ($Li(Ni_xMn_yCo_z)O_2$, where $0 \leq x \leq 1$, $0 \leq y \leq 1$, $0 \leq z \leq 1$, and $x+y+z=1$) (e.g., $LiMn_{0.33}Ni_{0.33}Co_{0.33}O2$), or a lithium nickel cobalt metal oxide ($LiNi_{(1-x-y)}Co_xM_yO_2$, where $0<x<0.2$, $y<0.2$, and M may be Al, Mg, Ti, or the like); or a lithium iron polyanion oxide with olivine structure, such as lithium iron phosphate ($LiFePO_4$), lithium manganese-iron phosphate ($LiMn_{2-x}Fe_xPO_4$, where $0<x<0.3$), or lithium iron fluorophosphate ($Li_2FePO_4F$).

In certain variations, the positive electroactive materials may be intermingled with an electronically conducting material that provides an electron conduction path and/or at least one polymeric binder material that improves the structural integrity of the electrode. For example, the electroactive materials and electronically or electrically conducting materials may be slurry cast with such binders, like polyvinylidene difluoride (PVdF), polytetrafluoroethylene (PTFE), ethylene propylene diene monomer (EPDM) rubber, or carboxymethyl cellulose (CMC), a nitrile butadiene rubber (NBR), styrene-butadiene rubber (SBR), lithium polyacrylate (LiPAA), sodium polyacrylate (NaPAA), sodium alginate, lithium alginate. Electrically conducting materials may include carbon-based materials, powdered nickel or other metal particles, or a conductive polymer. Carbon-based materials may include, for example, particles of graphite, acetylene black (such as KETCHEN™ black or DENKA™ black), carbon fibers and nanotubes, graphene, and the like. Examples of a conductive polymer include polyaniline, polythiophene, polyacetylene, polypyrrole, and the like. In certain aspects, mixtures of the conductive materials may be used. The positive electrode current collector 34 may be formed from aluminum (Al) or any other appropriate electrically conductive material known to those of skill in the art.

The negative electrode 22 includes an electroactive material as a lithium host material capable of functioning as a negative terminal of a lithium ion battery. The negative electrode current collector 32 may comprise a metal comprising copper, nickel, or alloys thereof or other appropriate electrically conductive materials known to those of skill in the art. In certain aspects, the positive electrode current collector 34 and/or negative electrode current collector 32 may be in the form of a foil, slit mesh, and/or woven mesh.

In certain aspects, the present disclosure provides improved negative electrodes 22 (e.g., anodes) incorporating improved electrochemically active negative electrode materials. The electrochemically active negative electrode material may be selected from the group consisting of: silicon, silicon-containing alloys, tin-containing alloys, and combinations thereof. By way of example, particles comprising silicon may include silicon, or silicon containing binary and ternary alloys and/or tin-containing alloys, such as Si—Sn, SiSnFe, SiSnAl, SiFeCo, $SnO_2$, and the like. Such negative electroactive materials suffer from significant volumetric expansion during lithium cycling (e.g., capable of accepting the insertion of lithium ions during charging of the electrochemical cell via lithiation or "intercalation" and releasing lithium ions during discharging of the electrochemical cell via delithiation or "deintercalation" or lithium alloying/dealloying).

Figure 2:
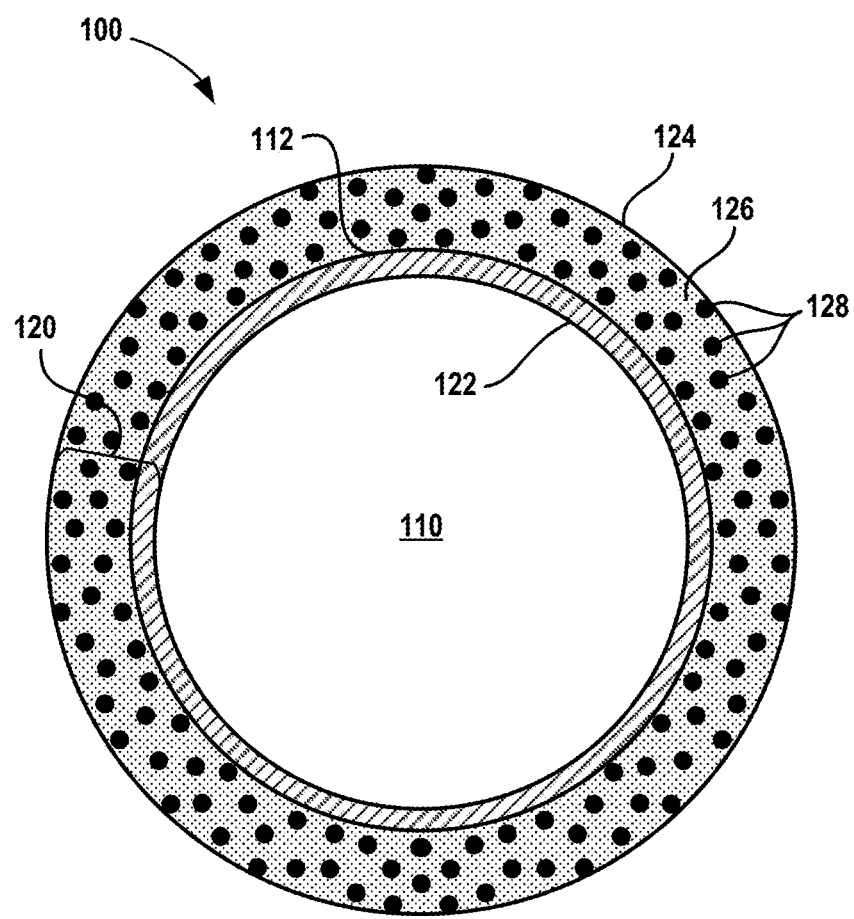
FIG. 2 is an illustration of a cross-sectional view of a negative electroactive material particle having a multilayer coating prepared in accordance with certain aspects of the present disclosure.

For example, as shown in FIG. 2, a negative electroactive particle 100 comprising a silicon-containing material forms a core region 110 that is capable of undergoing a significant volume expansion during lithium cycling, for example, during lithium ion intercalation or lithium alloying. In an initial state prior to lithium ion insertion or reaction, the core region 110 is in a first contracted state. After lithium ion insertion/intercalation or alloying, the particle is in a second expanded state having a much greater volume. For example, where the core region 110 is a silicon particle (Si) in the first contracted state, after lithium ion insertion it forms $Li_{4.4}Si$ (corresponding to the second expanded state). The volume of a silicon particle defining the core region 110 after lithium insertion in the second expanded state may be up to four (4) times (400%) larger than the volume of silicon particle in the first contracted state. As will be appreciated, the first contracted state may correspond to the volume of the core region 110 before lithium insertion or after lithium extraction. For a conventional silicon electroactive material, the extent of volumetric expansion that occurs can cause the silicon particle to mechanically degrade and break into a plurality of smaller fragments or pieces. When the particle breaks into smaller pieces, these fragments or smaller pieces can no longer maintain performance of the electrochemical cell.

By way of non-limiting example, electroactive particles comprising silicon that form the core region 110 may have an average particle size (D50) ranging from greater than or equal to about 10 nm to less than or equal to about 50 µm, optionally greater than or equal to about 50 nm to less than or equal to about 10 µm, and in certain variations, ranging from greater than or equal to about 150 nm to less than or equal to about 5 µm.

In accordance with various aspects of the present teachings, a negative electroactive material can be incorporated into a negative electrode in an electrochemical cell. With renewed reference to FIG. 2, the negative electroactive particle 100 includes the core region 110 having a surface 112. It should be noted that the features in FIG. 2 are not necessarily shown to scale, but rather are merely provided for purposes of illustration. A multilayer coating 120 is disposed over the surface 112. The multilayer coating 120 has elastomeric properties and thus is capable of minimizing or preventing fracturing of the negative electrode material 100 during lithium ion cycling. The multilayer coating 120 comprises at least two distinct layers. A first layer 122 is a coating comprising a carbon-containing or carbonaceous material.

In certain aspects, the carbonaceous coating that defines the first layer 122 is a carbonized material, which may be in an amorphous form, partially graphitized or graphitic carbon that is electrically conductive. The carbonaceous coating is electrically conductive and may be porous or non-porous. As used herein, the term "hard carbon" refers to a non-graphitizable carbon material. A non-graphitizable material is a carbon material that remains substantially amorphous even when exposed to high temperatures, whereas a "soft carbon" will crystallize and become graphitic at the same high temperatures. The carbonaceous coating in the first layer 122 may be formed by chemical layer deposition, atomic layer deposition (ALD), physical vapor deposition, chemical vapor infiltration, or pyrolysis of precursors deposited on the surface, by way of non-limiting example. Suitable precursors for forming the carbonaceous coating could include, but are not limited to polymers (e.g., polyvinyl alcohol, polyethylene, polypropylene) or liquid or gaseous hydrocarbons (e.g., methane propane, acetylene, octane, toluene). Pyrolysis may be conducted for deposition and carbonization, for example at a temperature range greater than or equal to about 400° C. to less than or equal to about 1,300° C. A duration of the pyrolysis process can depend on a thickness of carbon coating desired.

In certain variations, the first layer 122 may have a thickness corresponding to a size of the electroactive material particle. Thus, the negative electroactive material may have less than or equal to about 10% by weight of carbon to a weight of the overall particle, including the electroactive material. In certain variations, the first layer 122 may have a thickness of greater than or equal to about 1 nm to less than or equal to about 20 nm; and optionally greater than or equal to about 3 nm to less than or equal to about 20 nm.

The multilayer coating 120 includes a second layer 124 disposed over the first layer 122. The second layer 124 is porous and elastomeric. The second layer 124 thus comprises a polymeric elastomer material 126 in which a plurality of electrically conductive particles 128 are distributed. The polymeric elastomer material 126 may comprise silicon. In certain variations, the second layer 124 comprises at least one polymer or oligomer including a siloxane unit (e.g., —SiO—). A variety of siloxane based polymers are contemplated in the present disclosure and further discussed below.

A "siloxane polymer" refers to a cross-linked polymer that has a basic backbone of silicon and oxygen with side constituent groups that may be the same or different, generally described by the structural repeating unit $(-O-SiR^1R^2-)_n$, where $R^1$ and $R^2$ may be the same or different side constituent groups, and n may be any value above 2 designating the repetition of a structural repeating unit or monomer in the polymer. Siloxane polymers are also known in the art as "silicone" polymers. Siloxane polymers may include polyheterosiloxanes, where side constituent groups and/or structural repeating units may be different entities (having different side constituent groups), such as, for example, the siloxane co-polymer described by the nominal SRU formula, $(-O-SiR^1R^2)_n-(-O-Si-R^3R^4)_m$, wherein $R^1$ and $R^2$ are distinct side groups from $R^3$ and $R^4$. Further $R^1$ and $R^2$ may be different from one another, likewise the same may be true for $R^3$ and $R^4$. Generally, the R groups, for example, $R^1$, $R^2$, $R^3$, $R^4$, and the like may be an organic side group that includes any hydrocarbon or hydrocarbon derived side group. Examples of such hydrocarbon side groups include: alkyl, aryl, and cyclic hydrocarbon groups. Examples include without limitation: methyl, ethyl, propyl, butyl, pentyl, hexyl, heptyl, octyl, nonyl, decyl, phenyl, alkylphenyl, cyclopentyl, and phenylpropyl.

In one variation, the polymeric elastomer material 126 is a cross-linked dimethylsiloxane $(-O-SiR^1R^2)$, where $R^1$ and $R^2$ are both a methyl ($CH_3$) group, known as polydimethylsiloxane (PDMS). In another embodiment, the polymeric elastomer material 126 is a cross-linked diphenylsiloxane, where $R^1$ and $R^2$ are both a phenyl ($C_6H_5$) group, known as polydiphenylsiloxane (PDPS).

The coating forming the second layer 124 thus comprises a polymer matrix comprising a crosslinked polymer comprising a siloxane monomer and the plurality of electrically conductive particles 128, such as carbon black particles, that are distributed within the matrix. In certain variations, the plurality of electrically conductive particles 128 is homogeneously distributed with the polymeric elastomer material 126 matrix. As noted above, the polymer may be cross-linked, for example, carried out by conventional means, such as by exposure to irradiation or peroxide, a condensation reaction where the polymer is exposed to water, or a hydrosilylation reaction in the presence of a catalyst. Any method of crosslinking siloxane polymers may be used with the present disclosure, as recognized by those of skill in the art. In certain aspects, the siloxane resin/polymer precursor is reacted with water. For example, the silicon particle having the carbonaceous coating disposed thereon may be disposed in an aqueous bath comprising water and the siloxane resin(s).

A matrix mixture may be formed by admixing the plurality of conductive particles 128 into the polymer resin. The plurality of conductive particles are added at about 1% by weight to about 10% by weight of the total mixture depending on particle characteristics, including tendency to disperse in the matrix. In certain aspects, the plurality of electrically conductive particles 128 is well mixed into the polymer mixture for even or homogeneous distribution.

In one variation, the negative electroactive particles 100 comprising the core region 110 (e.g., silicon particle) having the first layer 122 of carbonaceous material applied are formed. These negative electroactive particles 100 having the first layer 124 are then mixed with electrically conductive particles 128 and precursor/polymer resin that will form the polymeric elastomer material 126. As noted above, the plurality of conductive particles 128 are added at about 1% by weight to about 10% by weight of the total mixture and the polymer resin can be mixed with greater than or equal to about 1% by weight to about 10% by weight of the resin. Once the negative electroactive particles 100, electrically conductive particles 128, and polymer resin are homogenously mixed, greater than or equal to about 100% by volume to less than or equal to about 300% by volume of water is added to the mixture to cure the silicone resin and form the polymeric elastomer material 126 matrix. Alternatively, the mixture can be heated up, for example, to about 300° C. to cure the resin.

The coating forming the second layer 124 comprises a plurality of pores 22, i.e., is porous, such that liquid electrolyte transporting lithium ions can access the first layer 122 and the negative electroactive material in the core region 110. In other aspects, a solid electrolyte may be embedded within select pores of the second layer 124 if the electrolyte has a particle size that is smaller than the pores of forming the second layer 124, for example, a particle size of approximately less than or equal to about 100 nm.

The coating that defines the second layer 124 has a porosity, i.e., a volume of pores relative to a volume of coating, of greater than or equal to about 20% to less than or equal to about 70%, such as a porosity of about 20%, about 30%, about 40%, about 50%, about 60%, or about 70%, by way of example.

An average diameter of the pores in the porous coating forming the second layer 124 may be greater than or equal to about 0.5 nm to less than or equal to about 500 nm, optionally greater than or equal to about 1 nm to less than or equal to about 400 nm, optionally greater than or equal to about 5 nm to less than or equal to about 300 nm, optionally greater than or equal to about 5 nm to less than or equal to about 200 nm, and in certain variations, optionally greater than or equal to about 5 nm to less than or equal to about 100 nm.

In certain variations, the second layer 124 may have a thickness of greater than or equal to about 1 nm to less than or equal to about 50 nm; and optionally greater than or equal to about 5 nm to less than or equal to about 50 nm.

The multilayer coating 120 may be substantially continuous over the surface 112 of the electroactive particle forming the core region 110, such that less than or equal to about 15%, optionally less than or equal to about 10%, optionally less than or equal to about 5%, and in certain aspects, less than or equal to about 2% of the surface area of the exposed surface 112 of the electroactive particle defining the core region 110 remains exposed.

The multilayer coating 120 may have an overall average thickness ranging from greater than or equal to about 2 nm to less than or equal to about 70 nm, optionally greater than or equal to about 5 nm to less than or equal to about 70 nm, and optionally greater than or equal to about 10 nm to less than or equal to about 60 nm.

The negative electroactive particle 100 with the multilayer coating 120 may have an average particle diameter that ranges from greater than or equal to about 10 nm to less than or equal to about 51 μm, optionally from greater than or equal to about 20 nm to less than or equal to about 50 μm, optionally from greater than or equal to about 25 nm to less than or equal to about 25 μm, and in certain aspects, optionally from greater than or equal to about 25 nm to less than or equal to about 10 μm.

The porous, electrically conductive, elastomeric multilayer coating 120 thus provides sufficient coverage of the exposed surface regions of the core region 110 to maintain and keep the negative electrode material that undergoes high volumetric expansion intact without fracturing and diminishing performance in the electrochemical cell, while having sufficient porosity to maintain lithium ion diffusion levels and having a high electrical conductivity to maintain electrical conduction.

In certain aspects, the multilayer coating 120 is elastomeric and flexible and thus capable of reversibly elongating by at least 50% from a contracted state to an expanded state in at least one direction to minimize or prevent fracturing of the negative electrode material 100 or holding the fractured electrode particles together to maintain both ionic and electrical conductivity during lithium ion cycling. In certain variations, a modulus of elasticity of the multilayer coating 120 coating may be less than or equal to about 2 GPa when the coating is saturated with liquid electrolyte, and in certain preferred variations, less than or equal to about 1 GPa. By reversibly elongating in at least one direction, it is meant that the polymeric multilayer coating 120 can expand and contract in at least one direction from an initial point (e.g., initial length $L_i$) to an expanded point (e.g., expanded length $L_e$) and return to or at least near to the initial point without mechanical fracture or failure. Thus, an elongation of at least 50% means that $$\frac{L_e - L_i}{L_i} \geq 50\%,$$

so that in an example where an initial average thickness of the multilayer coating corresponds to an Li of 50 μm, 50% elongation would amount to an expanded length $L_e$ of about 75 μm. In this manner, the flexible polymeric multilayer coating provides the ability to expand and contract with the electrode active material during lithium cycling. Depending on the electroactive material used, the multilayer coating may be capable of reversibly elongating by at least 75% from a contracted state to an expanded state in at least one direction, optionally by at least 100% from a contracted state to an expanded state in at least one direction, optionally by at least 125% from a contracted state to an expanded state in at least one direction, optionally by at least 150%, optionally by at least 175%, and in certain variations up to or exceeding 200% elongation from a contracted state to an expanded state in at least one direction to minimize or prevent fracturing of the negative electrode material during lithium ion cycling. The multilayer coating desirably has a lithium ion conductivity or diffusion rate that is greater than that of the electrode material, for example, greater than $10^{-12}$ to $10^{-14}$ cm$^2$/s. The multilayer coating desirably has an electrical conductivity of greater than or equal to about 1 S/cm to less than or equal to about 15 S/cm.

As illustrated in FIG. 3, a negative electrode 200 includes a current collector 210 and an active layer 220. A plurality of negative electroactive particles 230 include a core region 232 and a multilayer coating 234 that includes a first carbonaceous layer 236 and a second elastomeric electrically conductive porous layer 238. The plurality of negative electroactive particles 230 are distributed within a porous matrix 240 (pores not shown). The porous matrix 240 may comprise one or more polymeric binders 242 and a plurality of electrically conductive particles 244.

In this embodiment, the binder 242 may be a conventional binder like those described in the context of the positive electrode 24. Suitable binders include polyvinylidene difluoride (PVdF), polytetrafluoroethylene (PTFE), ethylene propylene diene monomer (EPDM) rubber, or carboxymethyl cellulose (CMC), a nitrile butadiene rubber (NBR), styrene-butadiene rubber (SBR), lithium polyacrylate (LiPAA), sodium polyacrylate (NaPAA), sodium alginate, lithium alginate and the like. The plurality of electrically conductive particles 244 may include carbon-based materials, powdered nickel or other conductive metal particles, or a conductive polymer. Carbon-based materials may include, for example, particles of graphite, acetylene black (such as KETCHEN™ black or DENKA™ black), carbon fibers and nanotubes, graphene, and the like. Examples of a conductive polymer include polyaniline, polythiophene, polyacetylene, polypyrrole, and the like. In certain aspects, mixtures of such conductive materials may be used.

The negative electrode 200 may include greater than or equal to about 50 weight % to less than or equal to about 90 weight %, and in certain aspects, optionally from greater than or equal to about 60 weight % to less than or equal to about 80 weight % of the plurality of negative electroactive particles 230. The negative electrode 200 may include greater than or equal to about 0.5 weight % to less than or equal to about 20 weight %, and in certain aspects, optionally from greater than or equal to about 10 weight % to less than or equal to about 20 weight % of the porous matrix 240. The negative electrode 200 may include greater than or equal to about 0.5 weight % to less than or equal to about 25 weight %, and in certain aspects, optionally from greater than or equal to about 10 weight % to less than or equal to about 15 weight % of the plurality of electrically conductive particles 244. The negative electrode 200 may include greater than or equal to about 1 weight % to less than or equal to about 40 weight %, and in certain aspects, optionally from greater than or equal to about 10 weight % to less than or equal to about 35 weight % of the more polymeric binders 242.

A negative electrode 200 may be made by mixing the negative electroactive material, such as silicon-containing particles having a multilayer coating, into a slurry with a polymeric binder compound, a non-aqueous solvent, optionally a plasticizer, and optionally if necessary, electrically conductive particles. The slurry can be mixed or agitated, and then thinly applied to a substrate via a doctor blade. The substrate can be a removable substrate or alternatively a functional substrate, such as a current collector (such as a metallic grid or mesh layer) attached to one side of the electrode film. In one variation, heat or radiation can be applied to evaporate the solvent from the electrode film, leaving a solid residue. The electrode film may be further consolidated, where heat and pressure are applied to the film to sinter and calendar it. In other variations, the film may be air-dried at moderate temperature to form self-supporting films. If the substrate is removable, then it is removed from the electrode film that is then further laminated to a current collector. With either type of substrate it may be necessary to extract or remove the remaining plasticizer prior to incorporation into the battery cell.

A battery may thus be assembled in a laminated cell structure, comprising an anode layer (in the form of the negative electrode 200), a cathode layer, and electrolyte/separator between the anode and cathode layers. The anode and cathode layers each comprise a current collector. A negative anode current collector may be a copper collector foil, which may be in the form of an open mesh grid or a thin film. The current collector can be connected to an external current collector tab.

For example, in certain variations, an electrode membrane, such as an anode membrane, comprises the electrode active material (e.g., silicon) dispersed in a polymeric binder matrix over a current collector. The separator can then be positioned over the negative electrode element, which is covered with a positive electrode membrane comprising a composition of a finely divided lithium insertion compound in a polymeric binder matrix. A positive current collector, such as aluminum collector foil or grid completes the assembly. Tabs of the current collector elements form respective terminals for the battery. A protective bagging material covers the cell and prevents infiltration of air and moisture. Into this bag, an electrolyte is injected into the separator (and may also be imbibed into the positive and/or negative electrodes) suitable for lithium ion transport. The electrolyte can fill open pores in the separator and electrodes, including in the open pores of the multilayer coating of the negative electroactive particles distributed in the negative electrode. In certain aspects, the laminated battery is further hermetically sealed prior to use.

FIG. 4 shows another variation of a negative electrode 300 with a different matrix than that shown in FIG. 3. The negative electrode 300 includes a current collector 310 and an active layer 320. A plurality of negative electroactive particles 330 are disposed within the negative electrode 300. Each negative electroactive particle includes a core region 332 and a multilayer coating 334. The multilayer coating 334 includes a first carbonaceous layer 336 and a second layer 338 that is elastomeric, electrically conductive, and porous. The plurality of negative electroactive particles 330 are distributed within a porous matrix 340 (pores not shown). The porous matrix 240 may comprise a siloxane binder 342 and a plurality of electrically conductive particles 344.

In this embodiment, the porous siloxane binder 342 may be a siloxane polymer like the siloxane polymer in the second layer 338 and may be any of the siloxane compositions discussed previously above, including polydimethylsiloxane (PDMS) and polydiphenylsiloxane (PDPS), by way of example. The plurality of electrically conductive particles 344 may be the same materials like the plurality of electrically conductive particles 244 discussed in the context of FIG. 3, for example, carbon-based materials, powdered nickel or other conductive metal particles, or a conductive polymer.

The negative electrode 300 may include greater than or equal to about 50 weight % to less than or equal to about 90 weight %, and in certain aspects, optionally from greater than or equal to about 60 weight % to less than or equal to about 80 weight % of the plurality of negative electroactive particles 330. The negative electrode 300 may include greater than or equal to about 0.5 weight % to less than or equal to about 20 weight %, and in certain aspects, optionally from greater than or equal to about 10 weight % to less than or equal to about 20 weight % of the porous matrix 340. The negative electrode 300 may include greater than or equal to about 0.5 weight % to less than or equal to about 25 weight %, and in certain aspects, optionally from greater than or equal to about 10 weight % to less than or equal to about 15 weight % of the plurality of electrically conductive particles 344. The negative electrode 300 may include greater than or equal to about 0.5 weight % to less than or equal to about 40 weight %, and in certain aspects, optionally from greater than or equal to about 10 weight % to less than or equal to about 35 weight % of the siloxane binder 342.

In various aspects, the present disclosure provides a negative electroactive material for use in a negative electrode of an electrochemical cell that cycles lithium ions. The negative electroactive material comprises a core region comprising silicon, silicon-containing alloys, tin-containing alloys, and combinations thereof. The negative electroactive material also comprises a multilayer coating disposed on a surface of the core region. The multilayer coating includes a first carbonaceous layer and a second porous elastomeric layer disposed over the first carbonaceous layer. The second porous elastomeric layer comprises siloxane and a plurality of electrically conductive particles. The multilayer coating is capable of reversibly elongating from a contracted state to an expanded state in at least one direction to minimize or prevent fracturing of the negative electroactive material during lithium ion cycling after being incorporated into an electrochemical cell.

Thus, a siloxane-based porous elastic multilayered structure is coated on the surface of high capacity electrode materials, such as silicon, which usually go through large volume changes during battery cycling. The multilayered structure forms an interconnected structure that enables the use of such electroactive materials in lithium ion batteries. The multilayer coating thus acts like a protection layer for the electroactive material to keep particles connected, which may crack and pulverize during the volume expansion and contraction. Further, the multilayer coating can be porous to receive an electrolyte, so that the multilayer coating is electronically conductive. In this manner, higher capacity electroactive materials, such as Si, can avoid potential issues often experienced where large volumetric expansion leads to battery failure after a small number of cycles. The multilayer coating system keeps the silicon particles intact and connected to electrode framework and structure during battery operation.

In certain variations, a lithium ion battery incorporating an inventive electroactive material having a multilayer surface coating system for minimizing or preventing fracturing of the negative electrode material during lithium ion cycling can maintain charge capacity within 80% of an initial charge capacity for greater than or equal to about 500 hours of battery operation, optionally greater than or equal to about 1,000 hours of battery operation, optionally greater than or equal to about 1,500 hours of battery operation, and in certain aspects, greater than or equal to about 2,000 hours or longer of battery operation (active cycling).

In certain variations, the lithium ion battery incorporating an inventive electroactive material having a multilayer surface coating system for minimizing or preventing fracturing of the negative electrode material during lithium ion cycling is capable of maintaining charge capacity within 80% of an initial charge capacity for at least 1,000 deep discharge cycles, optionally greater than or equal to about 2,000 deep discharge cycles, optionally greater than or equal to about 3,000 deep discharge cycles, optionally greater than or equal to about 4,000 deep discharge cycles, and in certain variations, optionally greater than or equal to about 5,000 deep discharge cycles.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A negative electrode for use in an electrochemical cell that cycles lithium ions, the negative electrode comprising:
a plurality of negative electroactive material particles comprising silicon, silicon-containing alloys, tin-containing alloys, and combinations thereof dispersed within a polymeric matrix, the plurality of negative electroactive material particles having a multilayer coating comprising a first non-porous carbonaceous layer disposed on a surface of each negative electroactive material particle and a second porous elastomeric layer disposed over the first non-porous carbonaceous layer, wherein the second porous elastomeric layer comprises siloxane and a first plurality of electrically conductive particles distributed in a plurality of pores in the second porous elastomeric layer, the first plurality of electrically conductive particles selected from the group consisting of carbon fibers, carbon nanotubes, carbon black, graphite particles, graphene sheet, and combinations thereof, wherein the multilayer coating is capable of reversibly elongating from a contracted state to an expanded state in at least one direction to minimize or prevent fracturing of the plurality of negative electroactive material particles during lithium ion cycling, and the polymeric matrix comprises at least one binder and a second plurality of electrically conductive particles distributed therein.

2. The negative electrode of claim 1, wherein the binder in the polymeric matrix also comprises the siloxane, and the first plurality of electrically conductive particles and the second plurality of electrically conductive particles are the same composition.

3. The negative electrode of claim 1, wherein the siloxane comprises a cross-linked siloxane formed from a monomer having the formula (—O—SiR$^1$R$^2$)$_n$, where R$^1$ and R$^2$ are selected from alkyl and aryl groups.

4. The negative electrode of claim 3, wherein the cross-linked siloxane comprises polydimethylsiloxane (PDMS) or polydiphenylsiloxane (PDPS).

5. The negative electrode of claim 1, wherein the first non-porous carbonaceous layer has a first thickness of greater than or equal to about 1 nm to less than or equal to about 20 nm and the second porous elastomeric layer has a second thickness of greater than or equal to about 1 nm to less than or equal to about 50 nm.

6. The negative electrode of claim 1, wherein the plurality of negative electroactive material particles has an average diameter ranging from greater than or equal to about 10 nm to less than or equal to about 50 µm, and the multilayer coating has an average thickness ranging from greater than or equal to about 2 nm to less than or equal to about 70 nm.

7. The negative electrode of claim 1, wherein the first plurality of electrically conductive particles and the second plurality of electrically conductive particles are independently selected from the group consisting of carbon black, graphite particles, carbon fibers, carbon nanotubes, graphene sheet, and combinations thereof.

8. The negative electrode of claim 1, wherein the plurality of negative electroactive material particles comprise silicon or a silicon-containing alloy, the siloxane comprises cross-linked siloxane comprises polydimethylsiloxane (PDMS), and the first plurality of electrically conductive particles comprise carbon black.

9. The negative electrode of claim 1, wherein the multilayer coating is capable of reversibly elongating by at least 50% from a contracted state to an expanded state in at least one direction to minimize or prevent fracturing of each of the plurality of negative electroactive material particles during lithium ion cycling.

10. A lithium-ion electrochemical cell comprising:
a negative electrode of claim 1;
a positive electrode comprising a positive electroactive material comprising lithium;
a separator; and
an electrolyte, wherein the multilayer coating minimizes or prevents fracturing of the negative electroactive material particles during lithium ion cycling to substantially maintain charge capacity of the lithium-ion electrochemical cell for greater than or equal to about 500 hours of operation.

11. The negative electrode of claim 1, wherein the first plurality of electrically conductive particles is distributed substantially homogeneously in the second porous elastomeric layer.

12. The negative electrode of claim 1, wherein the second porous elastomeric layer comprises the first plurality of electrically conductive particles at greater than or equal to about 1 weight % to less than or equal to about 10 weight %.

13. The negative electrode of claim 1, wherein the first non-porous carbonaceous layer comprises a carbonized material selected from the group consisting of: an amorphous carbon, a partially graphitized carbon, a graphitic carbon, and combinations thereof.

14. A negative electroactive material for use in a negative electrode of an electrochemical cell that cycles lithium ions, the negative electroactive material comprising:
a core region comprising silicon, silicon-containing alloys, tin-containing alloys, and combinations thereof; and
a multilayer coating disposed on a surface of the core region, the multilayer coating comprising a first non-porous carbonaceous layer and a second porous elastomeric layer disposed over the first non-porous carbonaceous layer, wherein the second porous elastomeric layer comprises siloxane and a plurality of electrically conductive particles distributed in a plurality of pores in the second porous elastomeric layer, the plurality of electrically conductive particles selected from the group consisting of: carbon fibers, carbon nanotubes, carbon black, graphite particles, graphene sheet, and combinations thereof, wherein the multilayer coating is capable of reversibly elongating from a contracted state to an expanded state in at least one direction to minimize or prevent fracturing of the negative electroactive material during lithium ion cycling.

15. The negative electroactive material of claim 14, wherein the siloxane comprises a cross-linked siloxane formed from a monomer having the formula $(-O-SiR^1R^2)_n$, where $R^1$ and $R^2$ are selected from alkyl and aryl groups.

16. The negative electroactive material of claim 15, wherein the cross-linked siloxane comprises polydimethylsiloxane (PDMS) or polydiphenylsiloxane (PDPS).

17. The negative electroactive material of claim 14, wherein the first non-porous carbonaceous layer has a first thickness of greater than or equal to about 1 nm to less than or equal to about 20 nm and the second porous elastomeric layer has a second thickness of greater than or equal to about 1 nm to less than or equal to about 50 nm.

18. The negative electroactive material of claim 14, wherein the core region has an average diameter ranging from greater than or equal to about 10 nm to less than or equal to about 50 µm, and the multilayer coating has an average thickness ranging from greater than or equal to about 2 nm to less than or equal to about 70 nm.

19. The negative electroactive material of claim 14, wherein the core region comprises silicon or a silicon-containing alloy, the siloxane comprises cross-linked siloxane comprises polydimethylsiloxane (PDMS), the plurality of electrically conductive particles comprise carbon black, and the multilayer coating is capable of reversibly elongating by at least 50% from a contracted state to an expanded state in at least one direction to minimize or prevent fracturing of the negative electroactive material during lithium ion cycling.

20. The negative electroactive material of claim 14, wherein the second porous elastomeric layer comprises the plurality of electrically conductive particles at greater than or equal to about 1 weight % to less than or equal to about 10 weight %.

* * * * *